United States Patent
Yamazaki et al.

(10) Patent No.: US 8,707,014 B2
(45) Date of Patent: Apr. 22, 2014

(54) ARITHMETIC PROCESSING UNIT AND CONTROL METHOD FOR CACHE HIT CHECK INSTRUCTION EXECUTION

(75) Inventors: Iwao Yamazaki, Kawasaki (JP); Hiroyuki Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 697 days.

(21) Appl. No.: 12/929,021

(22) Filed: Dec. 22, 2010

(65) Prior Publication Data
US 2011/0161631 A1    Jun. 30, 2011

(30) Foreign Application Priority Data

Dec. 25, 2009  (JP) ................................ 2009-296263
Nov. 26, 2010  (JP) ................................ 2010-264381

(51) Int. Cl.
*G06F 9/00*          (2006.01)
(52) U.S. Cl.
USPC .......................................... 712/207; 711/137
(58) Field of Classification Search
None
See application file for complete search history.

(56) References Cited

U.S. PATENT DOCUMENTS

| 6,499,116 | B1 | 12/2002 | Roth et al. | |
|---|---|---|---|---|
| 2003/0046494 | A1* | 3/2003 | Ziegler | .......................... 711/138 |
| 2004/0268045 | A1 | 12/2004 | Gray | |
| 2008/0046657 | A1* | 2/2008 | Eichenberger et al. | ........ 711/137 |
| 2009/0019266 | A1 | 1/2009 | Maeda | |
| 2010/0201703 | A1* | 8/2010 | Jiao | ................................ 345/589 |

FOREIGN PATENT DOCUMENTS

JP    8-335177    12/1996

OTHER PUBLICATIONS

Extended European Search Report for corresponding European Application No. 10196437.7, mailed Apr. 7, 2011.

* cited by examiner

*Primary Examiner* — Andrew Caldwell
*Assistant Examiner* — William B Partridge
(74) *Attorney, Agent, or Firm* — Staas & Halsey LLP

(57) ABSTRACT

According to an aspect of an embodiment of the invention, an arithmetic processing unit includes a first cache memory unit that holds a part of data stored in a storage device; an address register that holds an address; a flag register that stores flag information; and a decoder that decodes a prefetch instruction for acquiring data stored at the address in the storage device. The arithmetic processing unit further includes an instruction execution unit that executes a cache hit check instruction instead of the prefetch instruction on the basis of a decoded result when the flag information is held, the cache hit check instruction allowing for searching the first cache memory unit with the address to thereby make a first cache hit determination that the first cache memory unit holds the data stored at the address in the storage device.

17 Claims, 12 Drawing Sheets

| INDEX | WAY 0 | 1 | 2 | 3 | 4 | 5 | 6 | 7 | 8 | 9 |
|---|---|---|---|---|---|---|---|---|---|---|
| 0 | SECTOR 0 | SECTOR 0 | SECTOR 1 | | SECTOR 0 | SECTOR 1 | SECTOR 1 | SECTOR 1 | | SECTOR 1 |
| 1 | SECTOR 1 | SECTOR 0 | SECTOR 1 | SECTOR 0 | SECTOR 0 | SECTOR 1 | SECTOR 0 | SECTOR 1 | SECTOR 1 | SECTOR 1 |
| 2 | SECTOR 1 | SECTOR 1 | SECTOR 0 | SECTOR 1 | SECTOR 0 | SECTOR 1 | SECTOR 0 | SECTOR 1 | SECTOR 1 | SECTOR 0 |

| - | sector1_num | sector0_num | L1 HIT | SECTOR | - | hit_way |
|---|---|---|---|---|---|---|
| 63　　　16 | 15　　　12 | 11　　　8 | 7 | 6 | 5　　4 | 3　　　　0 |

FIG. 3

| - | sector1_num | sector0_num | L2 HIT | SECTOR | - | hit_way |
|---|---|---|---|---|---|---|
| 63    16 | 15    12 | 11    8 | 7 | 6 | 5    4 | 3    0 |

FIG. 4

ARITHMETIC PROCESSING UNIT AND CONTROL METHOD FOR CACHE HIT CHECK INSTRUCTION EXECUTION

CROSS-REFERENCE TO RELATED APPLICATION

This application is based upon and claims the benefit of priority of the prior Japanese Patent Application No. 2009-296263, filed on Dec. 25, 2009, and the Japanese Patent Application No. 2010-264381, filed on Nov. 26, 2010, entire contents of which are incorporated herein by reference.

FIELD

The embodiments discussed herein are directed to an arithmetic processing unit, an information processing device, and a control method.

BACKGROUND

Servers which act as information processing devices with a cache memory have been known. The cache memory is incorporated into a CPU (Central Processing Unit) or an arithmetic processing unit and disposed between a core section, functioning as an arithmetic section included in the CPU, and a main memory. The cache memory, which can be accessed more quickly than the main memory, stores data or instructions that are accessed at high frequency. The arithmetic processing unit loads data or instructions from the cache memory that can be accessed faster than the main memory, thereby shortening memory access time and improving the performance of the information processing device.

As one type of such cache memory, a sector cache is known which has cache memory divided into a plurality of zones referred to as sectors. In such a sector cache, the cache memory is divided into two types of sectors, so that one sector stores data that is used repeatedly, whereas the other stores data that is used less frequently.

Furthermore, to debug such a sector cache, a cache hit check function is used to determine whether data at a given memory address is stored in the cache memory. For example, the cache hit check function can be used for debugging compilers or hardware.

To read such a cache hit check result, a cache memory read bus or a dedicated transfer bus can be used.

Now, referring to an example of FIG. 10, the configuration of a cache unit which performs a pipeline operation for reading a cache hit check result will be described below. As illustrated in FIG. 10, the cache unit includes a cache memory, an instruction set storage unit, an instruction control unit, a priority logic circuit, a cache access circuit, a tag matching circuit, an LRU (Least-Recently-Used) circuit, a sector information decision circuit, a buffer, and an external interface.

The instruction set storage unit stores a set of instructions such as prefetch instruction codes or cache hit check instruction codes. The instruction control unit reads the cache hit check instruction code from the instruction set storage unit, and issues the resulting instruction to the priority logic circuit. The priority logic circuit determines the priority of processing an entered instruction. The cache access circuit accesses a cache memory by using the target access address to read a tag and LRU information.

The tag matching circuit compares the tag having been read by the cache access circuit with the tag at the target access address. Upon determining that there was a cache hit, the sector information decision circuit determines whether the sector may be set to 0 or 1. The LRU circuit stores the use sectors and the use frequency of each cache way. The buffer stores the cache hit check result. The cache hit check result stored in the buffer is transferred to the external interface.

Now, referring to FIG. 11, a method for reading cache hit check results via the cache memory read bus will be described below. As illustrated in FIG. 11, a pipeline operation reads a Hit bit, a hit_way bit, a sector 0/1_num bit, and a sector bit via the bus. Here, the pipeline operation refers to the sequential steps of determining the priority of commands to be executed by the priority logic circuit "P," accessing the cache memory to read a tag "T," matching tags "M," selecting data and storing it in the buffer "B," and redirecting data "R."

As illustrated in FIG. 11, in the case of a cache hit as a result of matching tags in tag matching "M," the Hit bit is determined to be "1" and a cache hit way number, i.e., a hit_way bit is determined. Then, in "B" for selecting data and storing it in the buffer, the Hit bit and the hit_way bit are available for data selection. However, the cache hit sector information (the sector 0/1_num bit and the sector bit in the example of FIG. 11) becomes accessible after a one-cycle delay relative to the data selection cycle, resulting in the pipeline operation being performed twice.

Now, referring to FIG. 12, a method for reading cache hit check results via the dedicated transfer bus will be described below. As illustrated in FIG. 12, the dedicated transfer bus is used to redirect cache hit check results. This allows the cache hit check result to be read in a single pipeline operation without taking into account the timing for data selection.

Patent Document 1: Japanese Laid-open Patent Publication No. 08-335177

As can be seen in the foregoing, the aforementioned method for using the cache memory read bus to read a cache hit check result requires performing two successive pipeline operations, thereby causing the cache hit check result to be read in a complicated manner. On the other hand, the aforementioned technique for using the dedicated transfer bus to read a cache hit check result requires an additional dedicated transfer bus, thereby causing an increase in manufacturing costs.

SUMMARY

According to an aspect of an embodiment of the invention, an arithmetic processing unit includes a first cache memory unit that holds a part of data stored in a storage device; an address register that holds an address; a flag register that stores flag information; and a decoder that decodes a prefetch instruction for acquiring data stored at the address in the storage device. The arithmetic processing unit further includes an instruction execution unit that executes a cache hit check instruction instead of the prefetch instruction on the basis of a decoded result when the flag information is held, the cache hit check instruction allowing for searching the first cache memory unit with the address to thereby make a first cache hit determination that the first cache memory unit holds the data stored at the address in the storage device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a view illustrating an exemplary arrangement of sectors 0/1 in a sector cache;

FIG. 3 is a view illustrating an exemplary format of an L1 hit information register;

FIG. 4 is a view illustrating an exemplary format of an L2 hit information register;

DESCRIPTION OF EMBODIMENTS

Preferred embodiments of the present invention will be explained with reference to accompanying drawings.

[a] First Embodiment

In this first embodiment, the configuration and processing flow of an arithmetic processing unit according to the first embodiment will be described in that order, and finally the effects of the first embodiment will be discussed.

Configuration of Arithmetic Processing Unit

Figure 1:
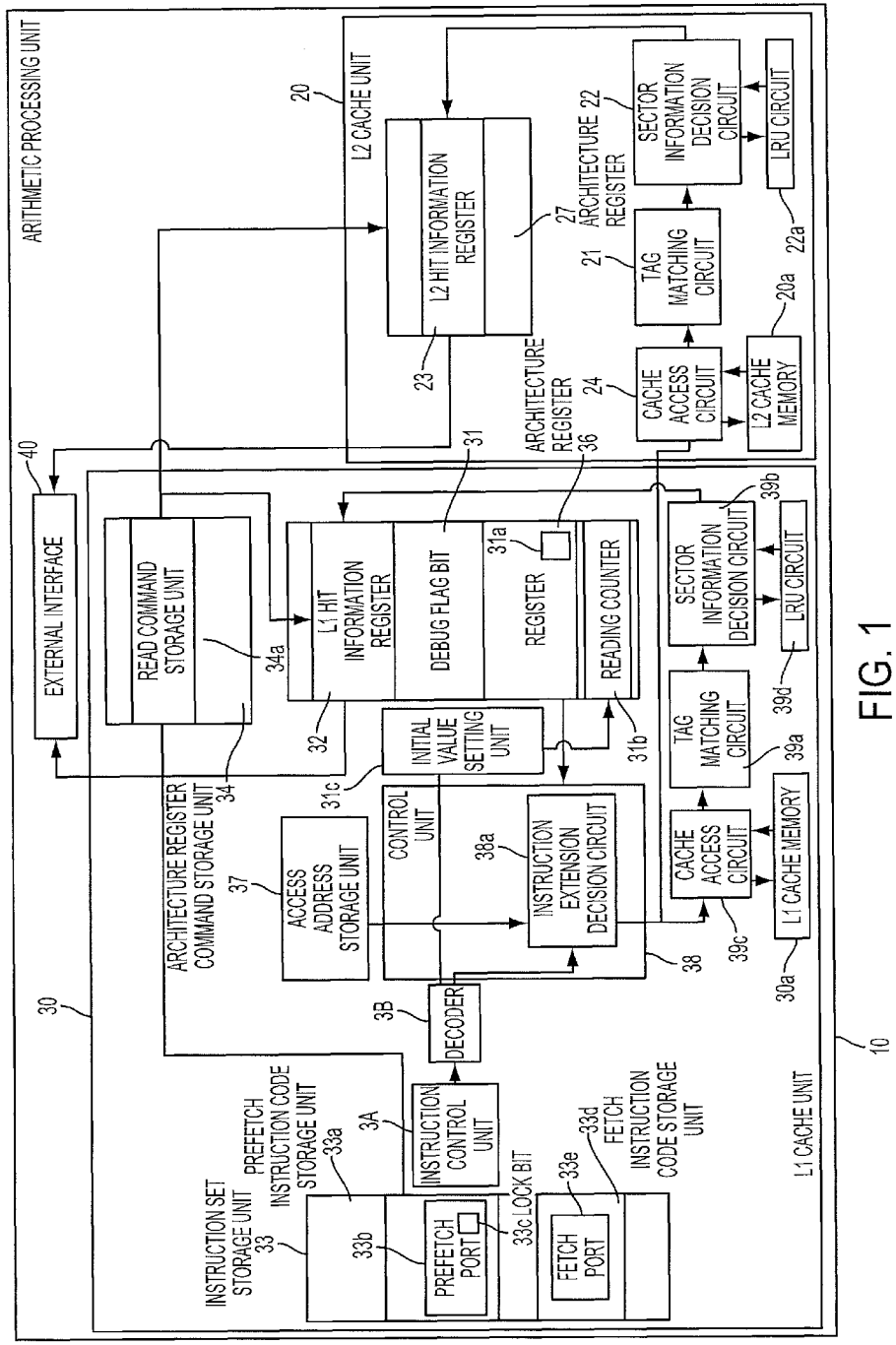
FIG. 1 is a block diagram illustrating the configuration of an arithmetic processing unit according to a first embodiment.

Referring to FIG. 1, the configuration of an arithmetic processing unit 10 will be described. FIG. 1 is a block diagram illustrating the configuration of the arithmetic processing unit 10 according to the first embodiment. As illustrated, the arithmetic processing unit 10 includes a first cache memory, i.e., an L2 (Level-2) cache unit 20 as a secondary cache memory, a second cache memory, i.e., an L1 (Level-1) cache unit 30 as a primary cache memory, and an external interface 40. The processing in each of these sections will be described below.

The L1 cache unit 30 includes an instruction set storage unit 33, an architecture register command storage unit 34, an architecture register 36, an access address storage unit 37, a control unit 38, a TAG matching circuit 39a, a sector information decision circuit 39b, a cache access circuit 39c, an instruction control unit 3A, a decoder 3B, an L1 cache memory 30a, a reading counter 31b, an initial value setting unit 31c, and an LRU circuit 39d. The access address storage unit 37 corresponds to "an address register" of Claims and the decoder 3B corresponds to "a decoding unit" of Claims. The L1 cache memory 30a corresponds to "a second cache memory unit" of Claims.

The instruction set storage unit 33 stores a set of instructions such as prefetch instruction codes and store instruction codes, and includes a prefetch instruction code storage unit 33a and a fetch instruction code storage unit 33d. The prefetch instruction code storage unit 33a stores prefetch instruction codes and includes a prefetch port 33b for accumulating issued prefetch instructions. A prefetch port 33b accumulates issued prefetch instructions, and includes a lock bit 33c indicating whether all store instructions have been completed. The lock bit 33c is set to "1" when the store instructions are not completed and to "0" when they are completed. The fetch instruction code storage unit 33d stores fetch instruction codes, and includes a fetch port 33e for accumulating issued load instructions. The prefetch port 33b corresponds to "a prefetch storage unit" of Claims, the lock bit 33c corresponds to "a lock information section" of Claims, and the fetch port 33e corresponds to "a fetch storage unit" of Claims.

The instruction control unit 3A reads an instruction code from the instruction set storage unit 33, and inputs a prefetch instruction code into the decoder 3B. For example, the instruction control unit 3A reads a prefetch instruction code from the prefetch instruction code storage unit 33a, and inputs it into the decoder 3B. The decoder 3B decodes the instruction code entered by the instruction control unit 3A, and inputs it into the control unit 38.

The architecture register 36 stores, for example, cache control information, address control information, error information, and interrupt information in the event of an error, and includes a register 31 and an L1 hit information register 32. More specifically, upon initiation of a cache hit check, a store instruction is issued and the store instruction decoded by the decoder 3B sets a debug flag bit 31a to the architecture register 36. To exit the cache hit check, the architecture register 36 causes the store instruction to the register 31 to set the debug flag bit 31a back to 0.

The L1 cache memory 30a is a sector cache with divided into two types of sectors, where one sector stores data that is used repeatedly, while the other stores data that is used less frequently. More specifically, as illustrated in FIG. 2, the L1 cache memory 30a is divided into sectors "0" and "1," so that repeatedly used data is stored in sector "0" and less frequently used data is stored in sector "1." For example, referring to the example of FIG. 2, the L1 cache memory 30a stores data sorted into sector "0" in way "1" of index "0," and data sorted into sector "1" in way "2" of index "0."

The L2 cache memory 20a is a sector cache that is divided into sectors. One sector stores therein data that are repeatedly used and another sector stores therein data that have low frequency in use. Specifically, the L2 cache memory 20a is divided into a sector "0" and a sector "1". The sector "0" stores data that are repeatedly used and the sector "1" stores data that have low frequency in use. Moreover, the L2 cache memory 20a corresponds to "a first cache memory unit" of Claims.

The register 31 holds the debug flag bit 31a which is a one-bit flag. The debug flag bit 31a stores flag information for changing a prefetch instruction and making it function as a cache hit check instruction. The debug flag bit 31a is set by a decoded store instruction obtained by the decoder 3B decoding an existing store instruction. When the value of the debug flag bit 31a is "1," a prefetch instruction is changed to function as a cache hit check instruction. Also, when the value of the debug flag bit 31a is "0," it serves as a prefetch instruction. Moreover, the debug flag bit 31a corresponds to "a flag register" of Claims.

The L1 hit information register 32 holds cache hit check results for the L1 cache memory 30a. The L1 hit information register 32 is provided independently for each of a plurality of cores in the CPU. Now, referring to FIG. 3, an example format of the L1 hit information register 32 will be described. As illustrated in FIG. 3, the L1 hit information register 32 holds cache hit check results in a 64-bit format, where bits 15-12 hold a sector1_num bit, bits 11-8 hold a sector0_num bit, bit 7 holds an L1 hit bit, bit 6 holds a sector bit, and bits 3-0 hold a hit_way bit. Moreover, the sector1_num bit and the sector0_num bit correspond to "a fourth sector information register" of Claims, the sector bit corresponds to "a second sector information register" of Claims, and the hit_way bit corresponds to "a second hit way information register" of Claims.

The L1 hit bit is set to "1" if a tag match is found as a result of a cache hit check, and if there is no tag match, the bit is set to "0." The sector information of all cache ways is read from the LRU circuit and the number of ways of each sector is counted. As a result, the sector0_num bit indicates the way number of sector 0 data with the same index as the memory address designated by the prefetch instruction irrespective of whether the value of the L1 hit bit is 0 or not 1. Moreover, the sector1_num bit indicates the way number of sector 1 data with the same index as the memory address designated by the prefetch instruction irrespective of whether the value of the L1 hit bit is 0 or not 1.

The sector bit indicates sector information of the memory address designated by the prefetch instruction when the value of the L1 hit bit is "1". The hit_way bit indicates the cache hit way number of the memory address designated by the prefetch instruction when the value of the L1 hit bit is "1". Furthermore, when the value of the L1 hit bit is "0", the bit data of the sector bit and the hit_way bit is set to invalid values (for example, all the values are set to "0").

Furthermore, an L2 hit information register 23 also holds cache hit check results in an L2 cache memory 20a, and is provided independently for each of a plurality of cores. The L2 hit information register 23 saves cache hit check results of the L2 cache memory 20a. Now, referring to FIG. 4, an example format of the L2 hit information register 23 will be described. As illustrated in FIG. 4, the L2 hit information register 23 holds cache hit check results in a 64-bit format, where bits 15-12 hold the sector1_num bit, bits 11-8 hold the sector0_num bit, bit 7 holds the L2 hit bit, bit 6 holds the sector bit, and bits 3-0 hold the hit_way bit. Moreover, the sector1_num bit and the sector0_num bit correspond to "a third sector information register" of Claims, the sector bit corresponds to "a first sector information register" of Claims, and the hit_way bit corresponds to "a first hit way information register" of Claims.

The L2 hit bit is set to "1" if a tag match is found as a result of a cache hit check, and if there is no tag match, the bit is set to "0." The sector information of all cache ways is read from the LRU circuit and the number of ways of each sector is counted. As a result, the sector0_num bit indicates the way number of sector 0 data with the same index as the memory address designated by the prefetch instruction irrespective of whether the value of the L2 hit bit is 0 or not 1. Furthermore, the sector1_num bit indicates the way number of sector 1 data with the same index as the memory address designated by the prefetch instruction irrespective of whether the value of the L2 hit bit is "0" or not "1".

The sector bit indicates sector information of the memory address designated by the prefetch instruction when the value of the L2 hit bit is "1". The hit_way bit indicates the cache hit way number of the memory address designated by the prefetch instruction when the value of the L2 hit bit is "1". On the other hand, when the value of the L2 hit bit is "0", the bit data of the sector bit and the hit_way bit is set to invalid values (for example, all the values are set to "0").

The reading counter 31b stores the number of cache hit check operations. The initial value of the reading counter 31b is set in the initial value setting unit 31c to be described later. Then, the reading counter 31b decrements its value each time the cache hit check is performed. When the value of the counter becomes "0", the cache hit check process is terminated. The initial value setting unit 31c sets an initial value in the reading counter 31b. Moreover, an initial value to be set in the reading counter 31b can be an arbitrary value as the number of cache hit check operations.

The architecture register command storage unit 34 stores Read commands and Write commands to the architecture register 36, and includes a Read command storage unit 34a for storing Read commands for reading cache hit check results stored in the L1 hit information register 32 and the L2 hit information register 23. The Read command storage unit 34a stores Read commands for reading hit information from the L1 hit information register 32 and the L2 hit information register 23.

Figure 5:
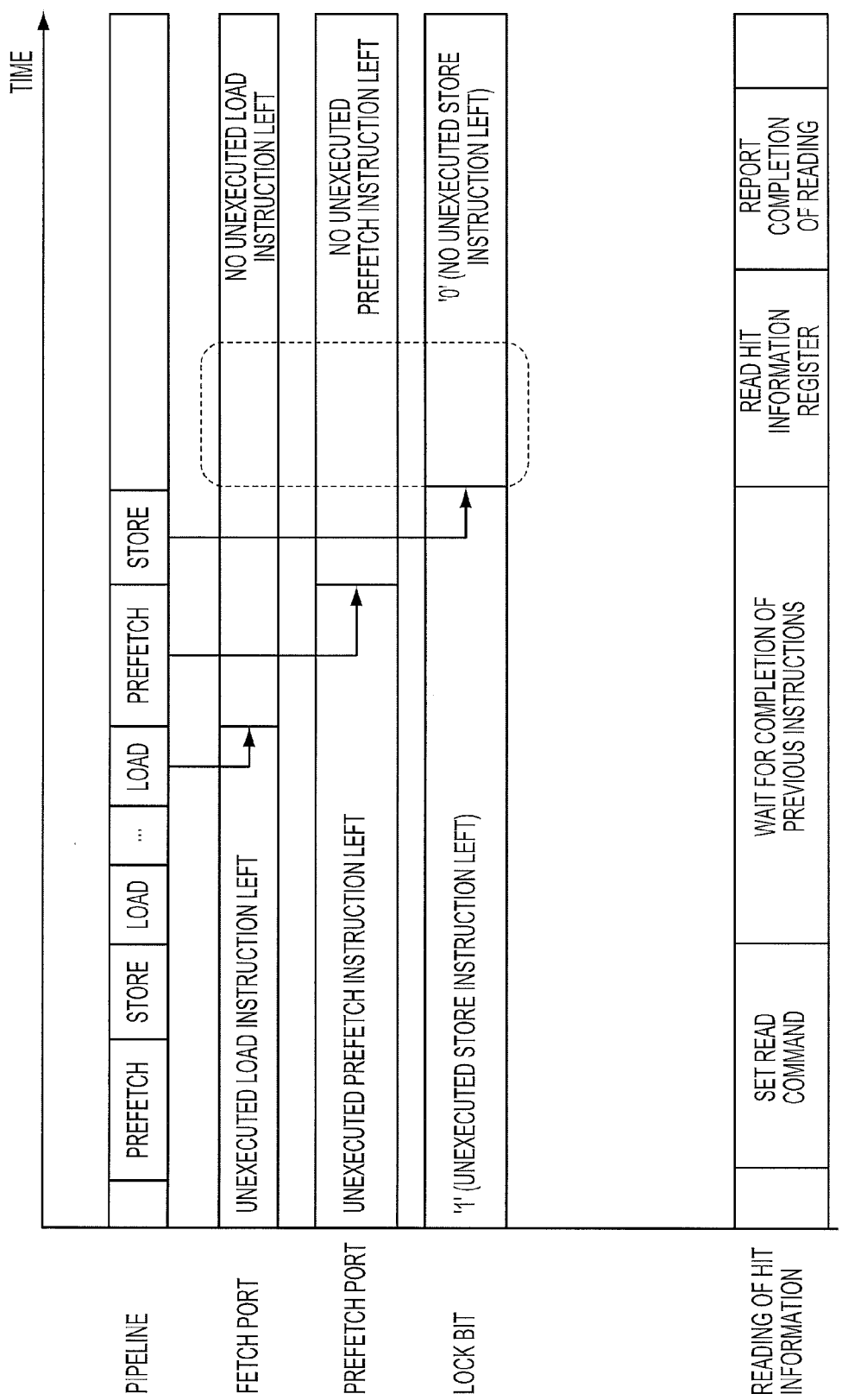
FIG. 5 is an explanatory time chart of reading with a Read command.

Now, referring to FIG. 5, a description will be specifically made as to how a Read command is executed. As illustrated in FIG. 5, the arithmetic processing unit 10 performs a prefetch step, a store step, and a load step in one pipeline operation. Then, the arithmetic processing unit 10 does not execute the Read command until given conditions are met. That is, while a program is being executed, a cache hit check may be conducted and any one of the load, store, or prefetch instruction, which was issued before the cache hit check was made, may have been uncompleted. Thus, the uncompleted instruction would be executed after the cache hit check is completed. This may cause the cache hit check result to be different from the actual cache status. Therefore, the arithmetic processing unit 10 sets the Read command to thereby perform a cache hit check after the load, store, and prefetch instructions are all completed.

More specifically, as illustrated in FIG. 5, with the Read command being set, the arithmetic processing unit 10 executes any unexecuted load instruction until there will be no unexecuted load instruction, thus making the fetch port empty. Furthermore, with the Read command being set, the arithmetic processing unit 10 executes any unexecuted prefetch instructions until there will be no unexecuted prefetch instruction, thus making the prefetch port empty. Then, the arithmetic processing unit 10 sets the lock bit to "0" when there is no more unexecuted store instruction left. Here, the lock bit is set to "1" if a previously issued store instruction is not completed, and to "0" if the instruction is completed.

Then, the arithmetic processing unit 10 executes the Read command when it is met as the execution conditions that the lock bit is at "0" and all the prefetch and fetch ports are empty. Here, by the status that all the prefetch and fetch ports are empty, it is meant that there are no unexecuted prefetch instructions in the prefetch port and no unexecuted load instructions in the fetch port.

That is, the lock bit being at 0 means that previous store instructions have all been completed, and the fact that the fetch port which holds preceding instructions is empty means that previous load instructions have all been completed. Furthermore, the prefetch port being empty means that previous prefetch instructions have all been completed. Accordingly, the arithmetic processing unit 10 sets a Read command to read hit information, and waits until an instruction issued before the setting of the Read command is completed. After the instruction has been completed, the arithmetic processing unit 10 reads hit information from the hit information register. As can be seen from the discussions above, after the aforementioned execution conditions are met, the Read command can be executed to ensure that all the instructions issued before the setting of the Read command are all completed.

The access address storage unit 37 stores the instruction address of a prefetch instruction, which is targeted by the prefetch instruction and of which notified is an instruction extension decision circuit 38a in the control unit 38.

The control unit 38 includes the instruction extension decision circuit 38a. When a prefetch instruction is issued, the instruction extension decision circuit 38a determines whether the debug flag bit 31a is at "1," and if so, extends the prefetch instruction to allow it to function as a cache hit check instruction. After that, the cache hit check instruction is entered into the decoder 3B. That is, the instruction extension decision circuit 38a makes changes in the instruction code of the prefetch instruction, and the decoder 3B, which has decode logic for cache hit check instructions, decodes the resulting instruction. Subsequently, the cache access circuit 39c receives the memory address. Furthermore, with the debug flag bit 31a at "0," the instruction extension decision circuit 38a provides control to perform the prefetch operation without extending any instructions.

Upon receiving the memory address from the instruction extension decision circuit 38a, the cache access circuit 39c accesses the L1 cache memory 30a according to the input memory address to read a tag. Then, the cache access circuit 39c inputs the tag having been read from the L1 cache memory 30a into the TAG matching circuit 39a.

Upon reception of the tag from the cache access circuit 39c, the TAG matching circuit 39a compares the tag registered in the L1 cache memory 30a with the tag at the access address. Based on the result of this comparison, the TAG matching circuit 39a then inputs a searching result, into the sector information decision circuit 39b, indicating whether there was a hit in the L1 cache memory 30a.

The sector information decision circuit 39b determines whether there was a cache hit based on the searching result by the TAG matching circuit 39a. Furthermore, the sector information decision circuit 39b takes out sector information of all ways with the same index as the memory address designated by the prefetch instruction from the LRU circuit 39d. As a result, upon determining that there was a cache hit, the sector information decision circuit 39b decides whether the sector may be set to 0 or 1. Furthermore, if it is determined that there was a cache hit, the sector information decision circuit 39b sets the L1 hit bit to "1" and updates the sector0_num bit, the sector1_num bit, the sector bit, and the hit_way bit in the L1 hit information register 32.

More specifically, when the value of the L1 hit bit of the L1 hit information register 32 is "1," the sector information decision circuit 39b allows for storing data in the L1 hit information register 32 as follows. That is, the way number of sector 0 data with the same index as the memory address designated in the prefetch instruction is stored in the "sector0_num." The way number of sector 1 data with the same index as the memory address designated in the prefetch instruction is stored in the "sector1_num." The sector information indicative of whether the sector is at 0 or 1 is stored in the "sector," and the hit way number is stored in the "hit_way."

On the other hand, upon determining that there was no cache hit, the sector information decision circuit 39b sets the L1 hit bit of the L1 hit information register 32 to "0" and updates the sector0_num bit and the sector1_num bit. Specifically, when the value of the L1 hit bit of the L1 hit information register 32 is "0," the sector information decision circuit 39b stores the way number of the sector 0 data with the same index as the memory address designated by the prefetch instruction in the "sector0_num" of the L1 hit information register 32 and the way number of the sector 1 data with the same index as the memory address designated by the prefetch instruction in the "sector1_num". The invalid information is stored in the "sector" and "hit_way" when there is no cache hit. That is, when the L1 hit bit is at "1," the sector0_num bit, the sector1_num bit, the sector bit, and the hit_way bit have a valid value in the L1 hit information register 32. Also, in the L1 hit information register 32, when the L1 hit bit at "0," the sector0_num bit and the sector1_num bit have a valid value, however, the sector bit and the hit_way bit have an invalid value. Additionally, while a hit check is made in the L1 cache memory 30a, a hit check is also conducted in the L2 cache memory 20a at the same time.

Furthermore, the arithmetic processing unit 10 needs no change in the instruction set storage unit 33 because additional instruction code is not needed. What is needed is only to change the control of the control unit 38 in a manner such that the prefetch instruction code is extended to a cache hit check instruction.

The L2 cache unit 20 includes a TAG matching circuit 21, a sector information decision circuit 22, an LRU circuit 22a, the L2 hit information register 23, a cache access circuit 24, an architecture register 27, and the L2 cache memory 20a.

Upon receiving a memory address from the instruction extension decision circuit 38a, the cache access circuit 24 accesses the L2 cache memory 20a according to the input memory address to read a tag. Then, the cache access circuit 24 inputs the tag having been read from the L2 cache memory 20a into the TAG matching circuit 21.

Upon receiving the tag from the cache access circuit 24, the TAG matching circuit 21 compares the tag registered in the L2 cache memory 20a with the tag at the access address. Based on the result of this comparison, the TAG matching circuit 21 then inputs the searching result, indicating whether there was a hit in the L2 cache memory 20a, into the sector information decision circuit 22.

The sector information decision circuit 22 determines whether there was a cache hit on the basis of the result searched by the TAG matching circuit 21. Furthermore, the sector information decision circuit 22 takes out sector information of all ways with the same index as the memory address designated by the prefetch instruction from the LRU circuit 22a. As a result, upon determining that there was a cache hit, the sector information decision circuit 22 decides whether the sector may be set to 0 or 1. Then, upon determining that there was a cache hit, the sector information decision circuit 22 sets the L2 hit bit to "1" and updates the sector0_num bit, the sector1_num bit, the sector bit, and the hit_way bit in the L2 hit information register 23. On the other hand, if it is determined that there was no cache hit, the sector information decision circuit 22 sets the L2 hit bit to "0", and updates the sector0_num bit and the sector1_num bit and invalidates the values of the sector bit and the hit_way bit in the L2 hit information register 23.

The architecture register 27 stores data used for various types of processing and in particular, includes the L2 hit information register 23. The L2 hit information register 23 saves information regarding hits of the L2 cache memory 20a. Like the L1 hit information register 32, the L2 hit information register 23 has also a format in which the sector0_num bit indicates the way number of sector 0 data with the same index as the memory address designated in the prefetch instruction irrespective of whether the value of the L2 hit bit is "0" or not "1". Furthermore, the L2 hit information register 23 includes the sector1_num bit which indicates the way number of sector 1 data with the same index as the memory address designated by the prefetch instruction irrespective of whether the value of the L2 hit bit is "0" or not "1".

The L2 hit information register 23 also includes the sector bit which indicates sector information of the memory address designated by the prefetch instruction when the value of the L2 hit bit is "1" and the hit_way bit which indicates the way number of the way of a hit in the L2 cache memory 20a when the value of the L2 hit bit is "1".

As such, the arithmetic processing unit 10 conducts cache hit checks with two commands separately; one is the store instruction for storing in the hit information registers 32 and 23, and the other is the load instruction for loading therefrom. More specifically, the arithmetic processing unit 10 first makes cache hit checks of both the L1 cache memory 30a and the L2 cache memory 20a, and writes the cache hit check results into the L1 hit information register 32 and the L2 hit information register 23. Next, the arithmetic processing unit 10 reads from the L1 hit information register 32 and the L2 hit information register 23.

For example, if there is a hit in the L2 cache memory 20a but no hit in the L1 cache memory 30a, the arithmetic processing unit 10 stores the cache hit check result in the L1 hit information register 32 as follows with the hit bit at "0." Then, the arithmetic processing unit 10 stores the way number of the sector 0 data with the same index as the memory address designated by the prefetch instruction in the "sector0_num" and stores the way number of the sector 1 data with the same index as the memory address designated by the prefetch instruction in the "sector1_num". Moreover, the arithmetic processing unit 10 sets the bit data of the "sector" and the "hit_way" to invalid values (for example, all the values are set to "0"). The cache hit check result is also stored in the L2 hit information register 23 as follows with the hit bit at "1." The "sector0_num" stores the way number of sector 0 data with the same index as the memory address designated in the prefetch instruction. The "sector1_num" stores the way number of sector 1 data with the same index as the memory address designated in the prefetch instruction. The "sector" stores sector information indicating whether the sector is at 0 or 1, and the "hit_way" stores the way number of the hit.

That is, the arithmetic processing unit 10 is designed such that the L1 hit information register 32 and the L2 hit information register 23 for saving cache hit information are added to the architecture registers 36 and 27. This allows for reading and writing on the L1 hit information register 32 and the L2 hit information register 23 using the existing store and load instructions, thereby eliminating the need for dedicated commands.

Furthermore, the arithmetic processing unit 10 can save the 64-bit cache hit check results of both the L1 cache memory 30a and the L2 cache memory 20a (see FIGS. 3 and 4) into the hit information registers and read the cache hit check results. This can be done each time a cache hit check is made, irrespective of the status of whether the arithmetic processing unit 10 has a cache hit or miss for the cache memory devices. Note that by way of example, the cache hit check may be used for hardware debugging, which is effective for examining the cache status after a program has been executed completely.

Processing by Arithmetic Processing Unit

Figure 6:
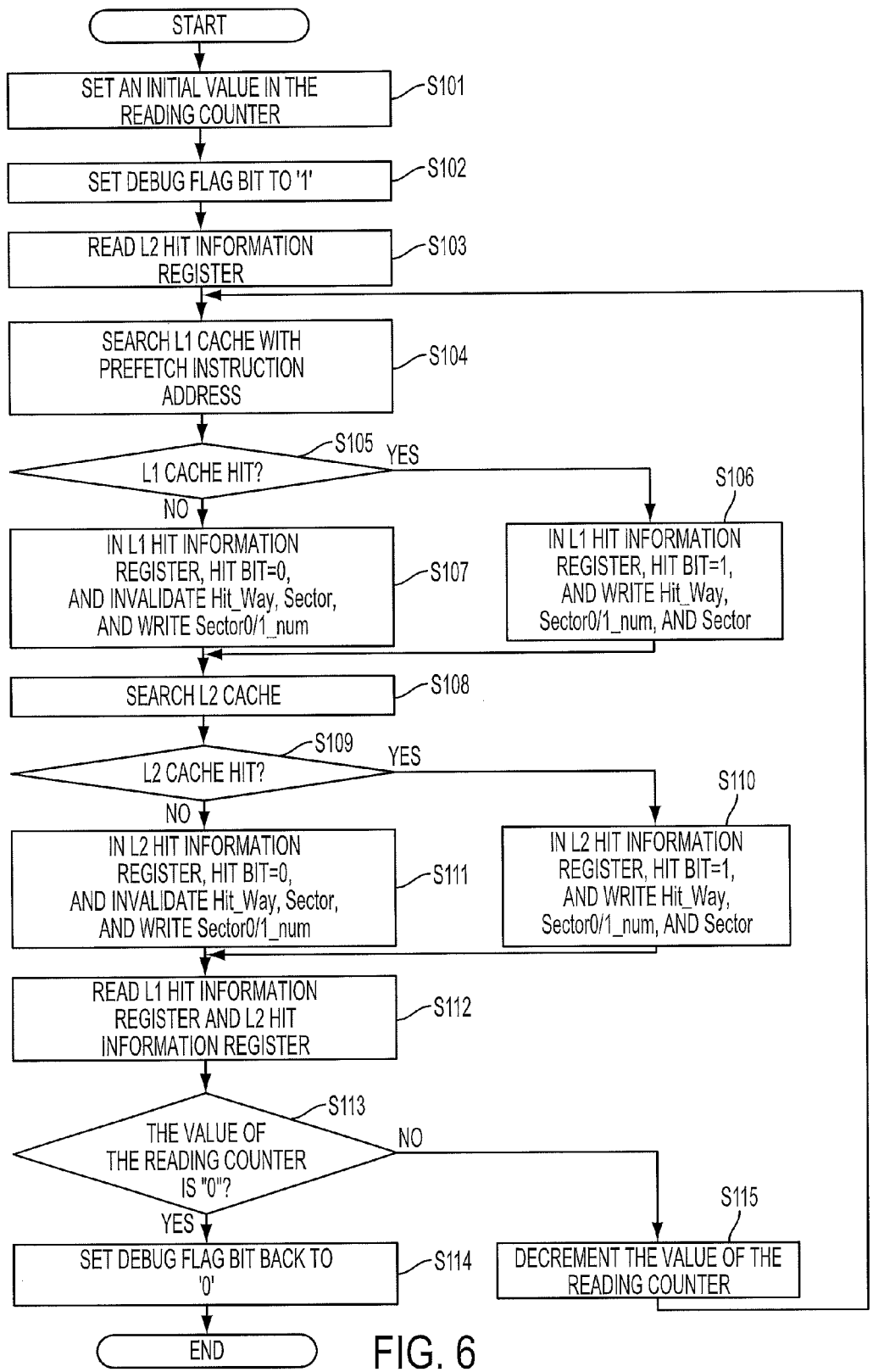
FIG. 6 is an explanatory flowchart of processing steps in the arithmetic processing unit according to the first embodiment.

Now, referring to FIG. 6, the processing by the arithmetic processing unit 10 according to the first embodiment will be described. FIG. 6 is a flowchart illustrating the processing steps in the arithmetic processing unit 10 according to the first embodiment.

As illustrated in FIG. 6, in the arithmetic processing unit 10, the initial value setting unit 31c sets an initial value in the reading counter 31b (step S101). Then, the arithmetic processing unit 10 sets the debug flag bit 31a to "1" in accordance with the store instruction for storing the contents of the architecture register 36 (step S102), and issues a Read command to read hit information from the L2 hit information register 23 (step S103). Then, when the arithmetic processing unit 10 issues a prefetch instruction with the debug flag bit 31a at 1, the instruction extension allows the prefetch instruction to serve as the cache hit check instruction, thus searching the L1 cache memory 30a with the prefetch instruction address (step S104).

Then, the arithmetic processing unit 10 determines whether there was a cache hit on the basis of the result of the search (step S105). If there was a cache hit ("Yes" in step S105), the arithmetic processing unit 10 sets the L1 hit bit to "1," and updates the sector0_num bit, the sector1_num bit, the sector bit, and the hit_way bit in the L1 hit information register 32 (step S106). On the other hand, upon determining that there was no cache hit ("No" in step S105), the arithmetic processing unit 10 sets the L1 hit bit to "0," and updates the sector0_num bit and the sector1_num bit and invalidates the sector bit and the hit_way bit in the L1 hit information register 32 (step S107).

Subsequently, the arithmetic processing unit 10 searches the L2 cache memory 20a with the prefetch instruction address (step S108). Then, the arithmetic processing unit 10 determines whether there was a cache hit on the basis of the result of the search (step S109). If there was a cache hit ("Yes" in step S109), the arithmetic processing unit 10 sets the L2 hit bit to "1," and updates the sector0_num bit, the sector1_num bit, the sector bit, and the hit_way bit in the L2 hit information register 23 (step S110). On the other hand, if it is determined that there was no cache hit ("No" in step S109), the arithmetic processing unit 10 sets the L2 hit bit to "0", and updates the sector0_num bit and the sector1_num bit and invalidates the sector bit and the hit_way bit in the L2 hit information register 23 (step S111).

After that, the arithmetic processing unit 10 issues a Read command to read the value of the hit information register (step S112), and determines whether the value of the reading counter 31b is "0" (step S113). When the value of the reading counter 31b is not "0" ("No" in step S113), the arithmetic processing unit 10 decrements the value of the reading counter 31b (step S115) and returns the process control to step S104. Alternatively, if the cache hit information of all cache lines to be acquired this time has been acquired ("Yes" in step S113), the arithmetic processing unit 10 sets the debug flag bit 31a back to "0" (step S114), and then ends the processing.

Effects of First Embodiment

As described above, the arithmetic processing unit 10 has the debug flag bit 31a indicative of whether a cache hit check for examining the cache status is to be conducted. Then, if the debug flag bit 31a indicates that a cache hit check is to be made and when a prefetch instruction is received, the prefetch instruction is extended to perform the cache hit check. Then, when the cache hit check is conducted, the arithmetic processing unit 10 provides control to store a cache hit check result in the L1 hit information register 32 and the L2 hit information register 23, and read a cache hit check result stored in the hit information registers 32 and 23. This enables the arithmetic processing unit 10 to easily read the cache hit check result without disposing a dedicated transfer bus between the sector information decision circuit and the external interface. Furthermore, the arithmetic processing unit 10 can take out a sector use status of a cache index to be checked at one time.

Furthermore, the arithmetic processing unit 10 can use the existing load and store instructions to read and write because the cache hit information register is provided as the architecture register 36. On the other hand, with the architecture register 36 not employed, a dedicated path would be used to directly read cache hit information. But, the use of the architecture register 36 eliminates the need for providing a dedicated transfer bus between the sector information decision circuit and the external interface.

Furthermore, according to the first embodiment, the arithmetic processing unit 10 extends the prefetch instruction to conduct a cache hit check if the debug flag bit stored indicates that a cache hit check is to be made and when a prefetch instruction is received. This allows for expanding the prefetch instruction code to a cache hit check instruction, thereby enabling a cache hit check to be made without the need of a new debug instruction code. Note that the prefetch instruction is an instruction code which is executed without changing in the architecture register 36, and can thus be used easily in parallel to the debug instruction.

Furthermore, according to the first embodiment, the arithmetic processing unit 10 provides control to read the cache hit check result stored in the hit information registers 32 and 23 when previous instructions in the cache have been completed. Accordingly, the arithmetic processing unit 10 can read an appropriate cache hit check result after making sure that all the previous instructions in the L1/2 cache are completed.

Furthermore, according to the first embodiment, the arithmetic processing unit 10 stores the indication that a cache hit check is to be conducted when the debug flag bit 31a receives the store instruction. Then, the arithmetic processing unit 10 provides control to read the cache hit check result stored in the hit information registers 32 and 23 when the hit information registers 32 and 23 receive a Read command. This allows for reading and writing on the hit information registers 32 and 23 with the existing Read and store instructions.

[b] Second Embodiment

It may also be acceptable to provide an address register for setting the memory address with which a cache hit check is to be made, so that the cache hit check is conducted only when the prefetch instruction address and the memory address are found to match with each other through a comparison therebetween.

Figure 7:
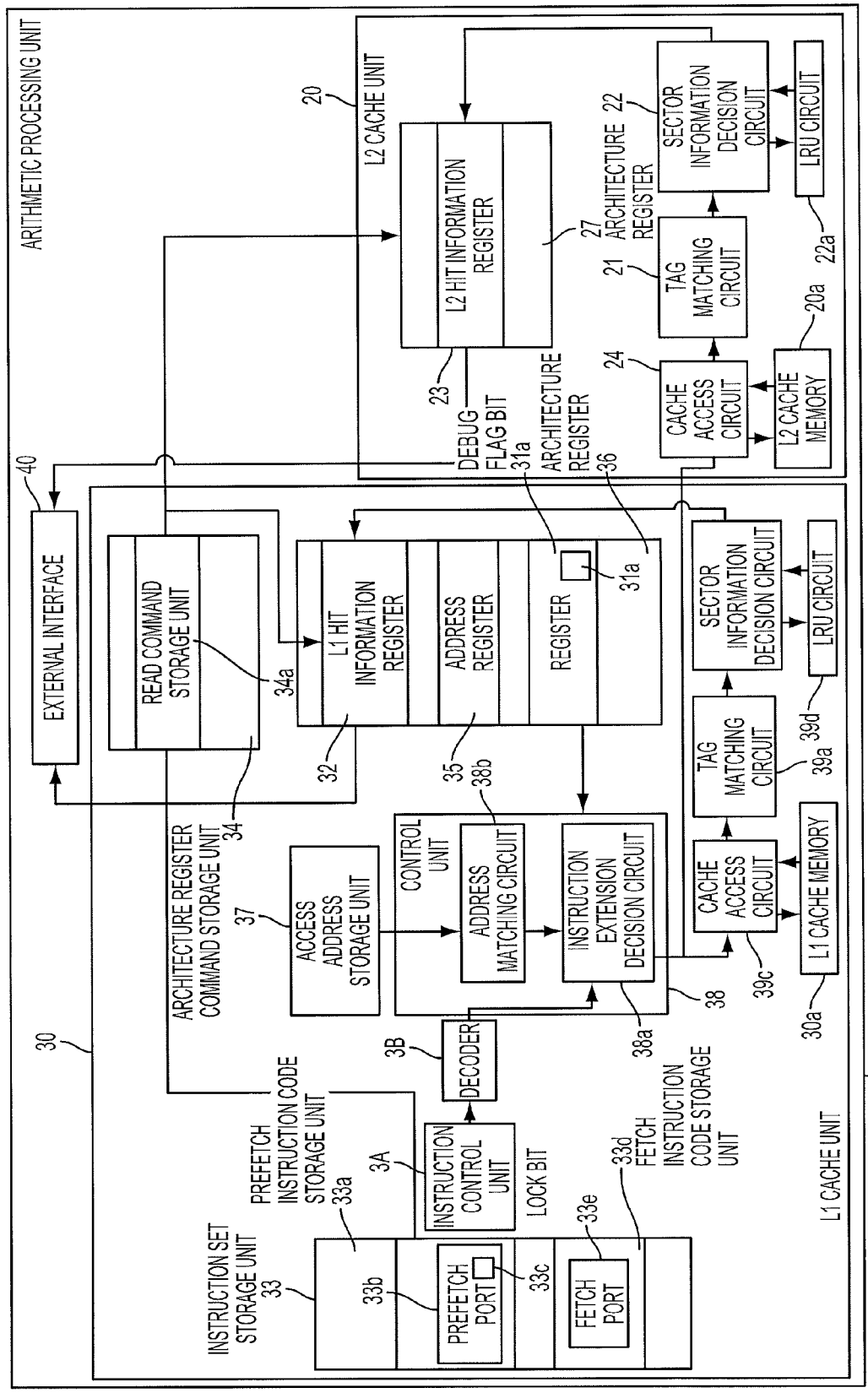
FIG. 7 is a block diagram illustrating the configuration of an arithmetic processing unit according to a second embodiment.
Figure 8:
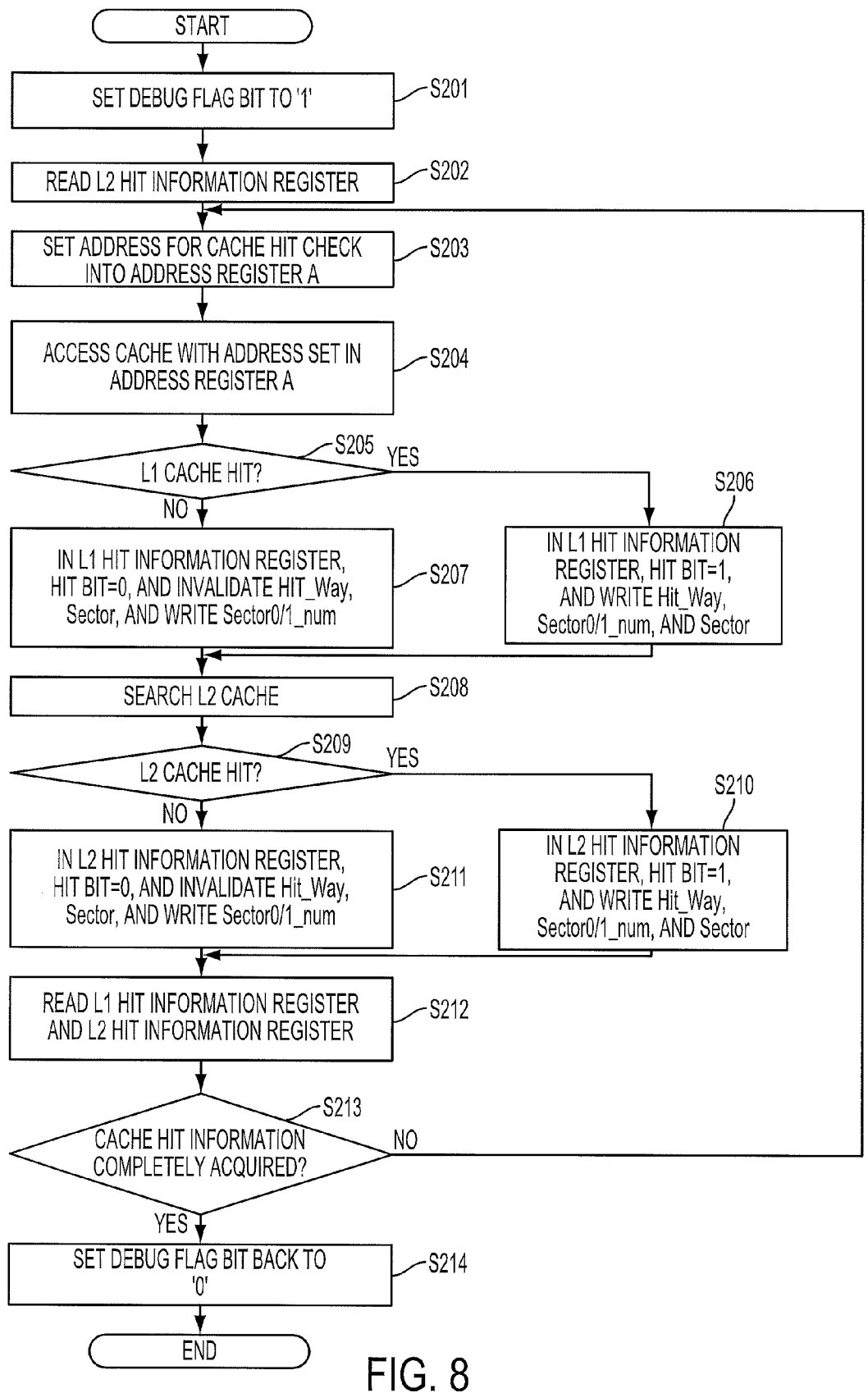
FIG. 8 is an explanatory flowchart of processing steps in the arithmetic processing unit according to the second embodiment.

In this context, referring to FIGS. 7 and 8, a second embodiment will be described blow, where a cache hit check is conducted only when the prefetch instruction address and the memory address are found to match with each other through a comparison therebetween. FIG. 7 is a block diagram illustrating the configuration of an arithmetic processing unit according to the second embodiment. FIG. 8 is a flowchart illustrating the processing steps in the arithmetic processing unit according to the second embodiment.

First, an arithmetic processing unit 10A according to the second embodiment is different from the arithmetic processing unit 10 illustrated in FIG. 1 in that an address register 35 and an address matching circuit 38b are additionally included. In such an arithmetic processing unit 10A, the address register 35 stores the memory address at which a cache hit check is to be made.

The address matching circuit 38b conducts a cache hit check only when the prefetch instruction address and the memory address are found to match with each other through a comparison therebetween. More specifically, the address matching circuit 38b acquires the prefetch instruction address targeted by the prefetch instruction from the access address storage unit 37, and reads from the address register 35 the memory address at which the cache hit check is performed. Then, the address matching circuit 38b inputs an instruction for making a cache hit check into the instruction extension decision circuit 38a, when the prefetch instruction address and the memory address, at which the cache hit check is to be made, are compared and found to match with each other.

Now, the processing of the arithmetic processing unit 10A according to the second embodiment will be described. The processing of the arithmetic processing unit 10A of the second embodiment is different from that of the arithmetic processing unit 10 according to the first embodiment, illustrated in FIG. 6, in that a cache hit check is conducted only when the prefetch instruction address and the memory address are compared and found to match with each other.

That is, as illustrated in FIG. 8, the arithmetic processing unit 10A issues a Read command to read on the L2 hit information register 23 (step S202), and then issues a store instruction to the address register 35 to set the memory address at which a cache hit check is to be made (step S203).

Then, the arithmetic processing unit 10A accesses the cache according to the memory address stored in the address register 35 (step S204). Next, the arithmetic processing unit 10A determines whether the memory address in the address register 35 and the memory address of the prefetch instruction match with each other (step S205). As a result, if the memory address in the address register 35 and the memory address of the prefetch instruction match with each other, the arithmetic processing unit 10A executes a cache hit check. When there is a cache hit by the cache hit check ("Yes" in step S205), the arithmetic processing unit 10A sets the L1 hit bit to "1," and updates the sector0_num bit, the sector1_num bit, the sector bit, and the hit_way bit in the L1 hit information register 32 (step S206).

Moreover, when there is no cache hit by the cache hit check ("No" in step S205), the arithmetic processing unit 10A sets the L1 hit bit to "0," and updates the sector0_num bit and the sector1_num bit and invalidates the bit data of the sector bit and the hit_way bit in the L1 hit information register 32 (step S207).

Subsequently, like the arithmetic processing unit 10 of the first embodiment, regardless of whether there is a cache hit or not in the L1 cache memory 30a, the arithmetic processing unit 10A also searches the L2 cache memory 20a and updates the information in the L2 hit information register 23 (steps S208 to S212). After that, the arithmetic processing unit 10A determines whether cache hit information has been acquired (step S213). When the cache hit information of all cache lines to be acquired this time was not acquired ("No" in step S213), the arithmetic processing unit 10A returns to the step S203. Alternatively, if the cache hit information was acquired ("Yes" in step S213), the arithmetic processing unit 10A sets the debug flag bit back to "0" (step S214), and then ends the processing.

As such, according to the second embodiment, the arithmetic processing unit 10A includes the address register 35 and the address matching circuit 38b. The address register 35 stores the check target address, at which the cache is checked for a hit. The address matching circuit 38b compares the check target address with the prefetch instruction address targeted by the prefetch instruction in order to determine if the addresses coincide with each other. Then, on the basis of the result of the comparison, the arithmetic processing unit 10A extends the prefetch instruction to conduct a cache hit check. This is done when the check target address and the prefetch instruction address match with each other and the debug flag bit stored indicates that the cache hit check is to be made. It is thus possible to focus on one instruction in a program and thereby know changes in cache status while the program is running.

[c] Third Embodiment

While the embodiments have been described above, these embodiments can be implemented in different forms than described above. In this context, another embodiment of the present invention will be described below as a third embodiment.

(1) System Configuration

Each component of each device illustrated is functional and conceptual, and thus not necessarily configured physically as illustrated. That is, each of the devices may be specifically integrated or disintegrated without being limited to the ones illustrated, so that all or part of the devices can be integrated or disintegrated in any functional or physical units, for example, depending on the various types of loads and service conditions. For example, the instruction extension decision circuit and the address matching circuit may be integrated with each other.

(2) Server Configuration

Figure 9:
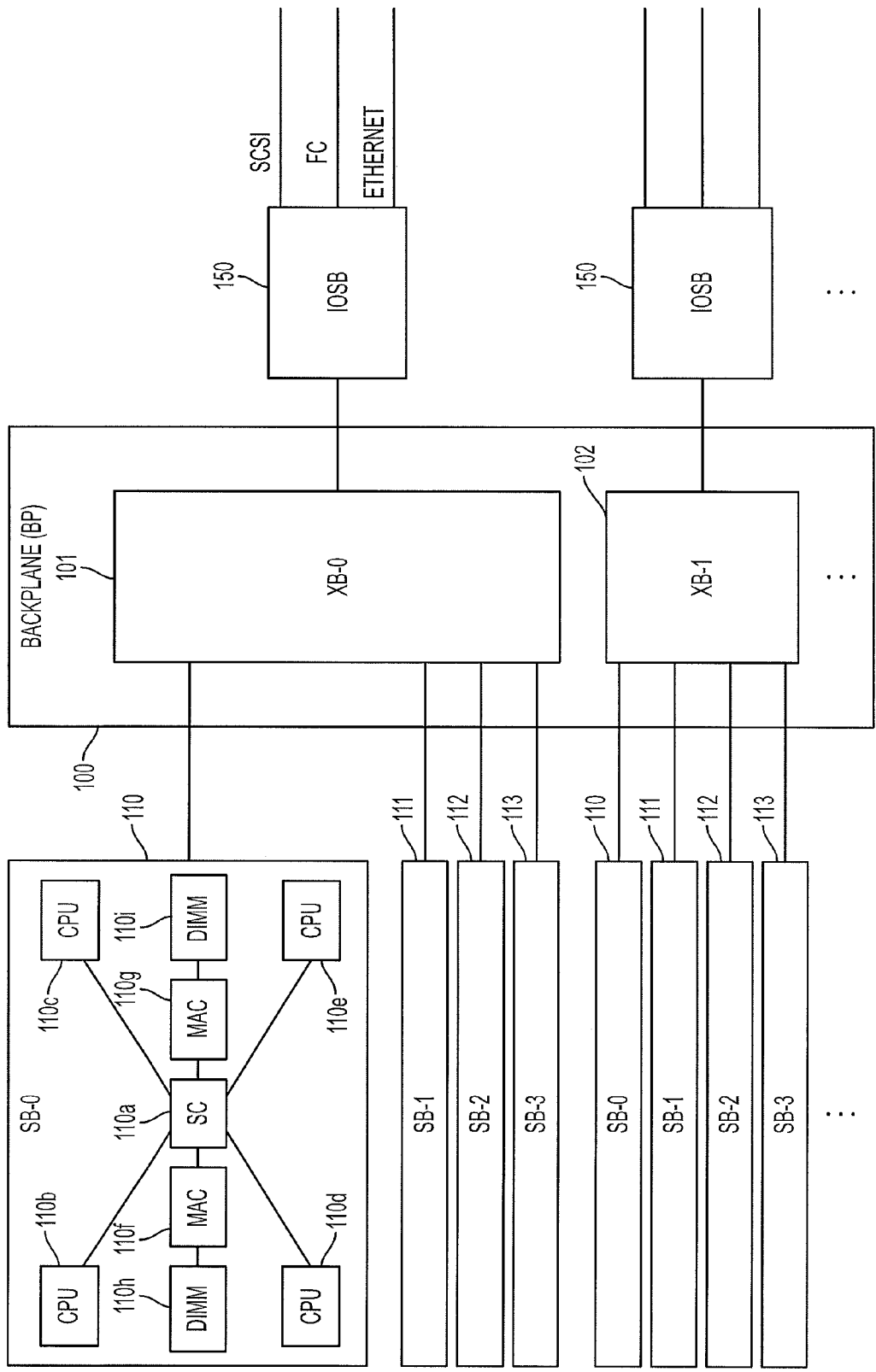
FIG. 9 is a view illustrating the configuration of servers.
Figure 10:
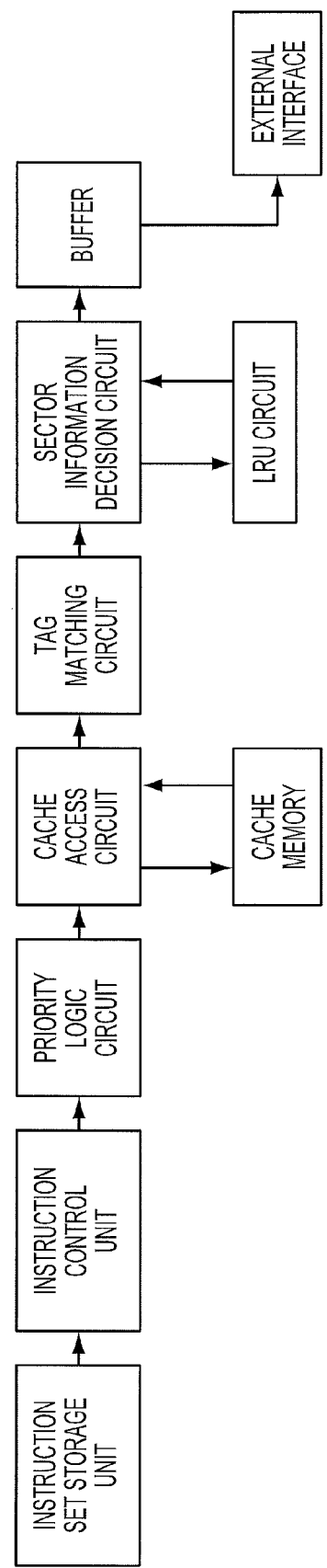
FIG. 10 is a block diagram illustrating the configuration of an L1 cache unit for executing a pipeline operation to read cache hit check results.
Figure 11:
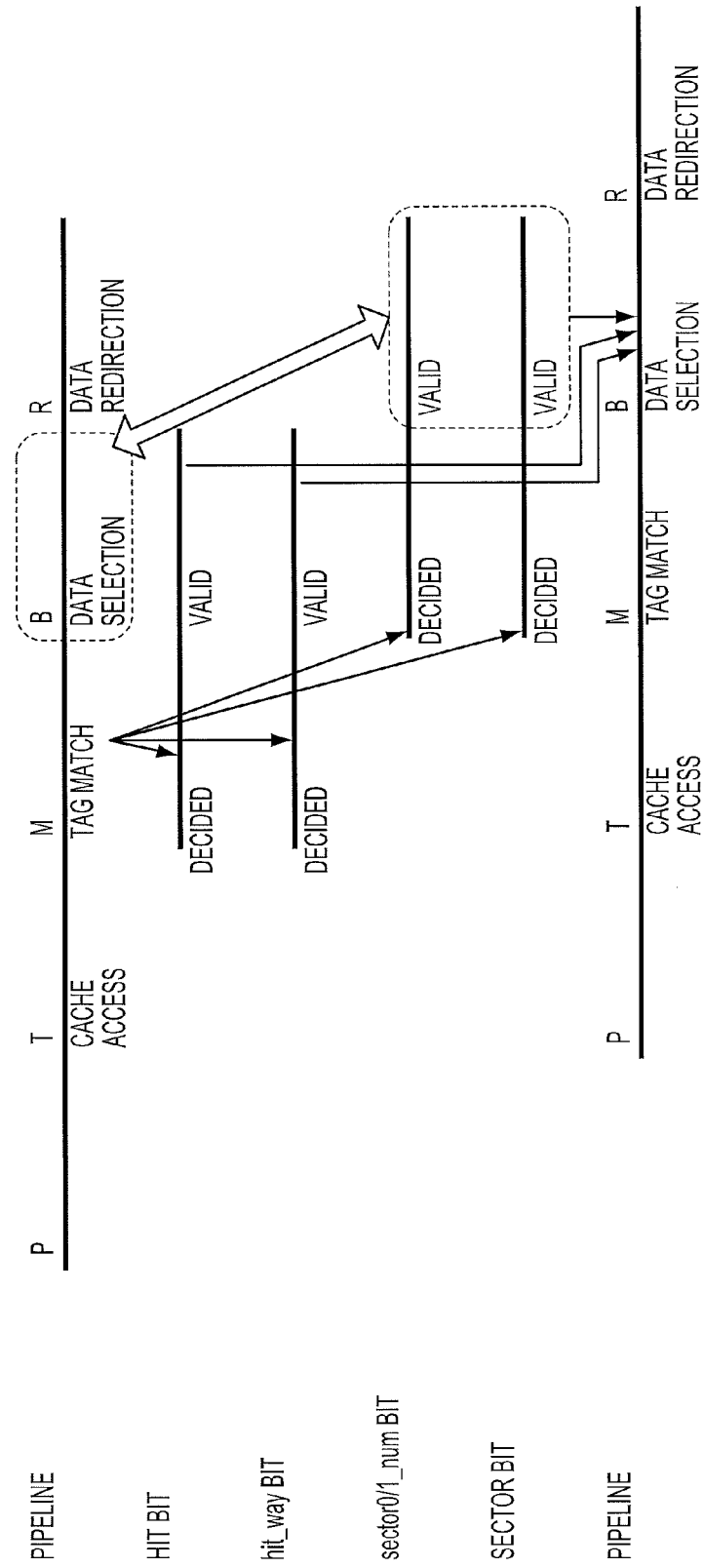
FIG. 11 illustrates a time chart for a cache memory read bus used to read cache hit check results.
Figure 12:
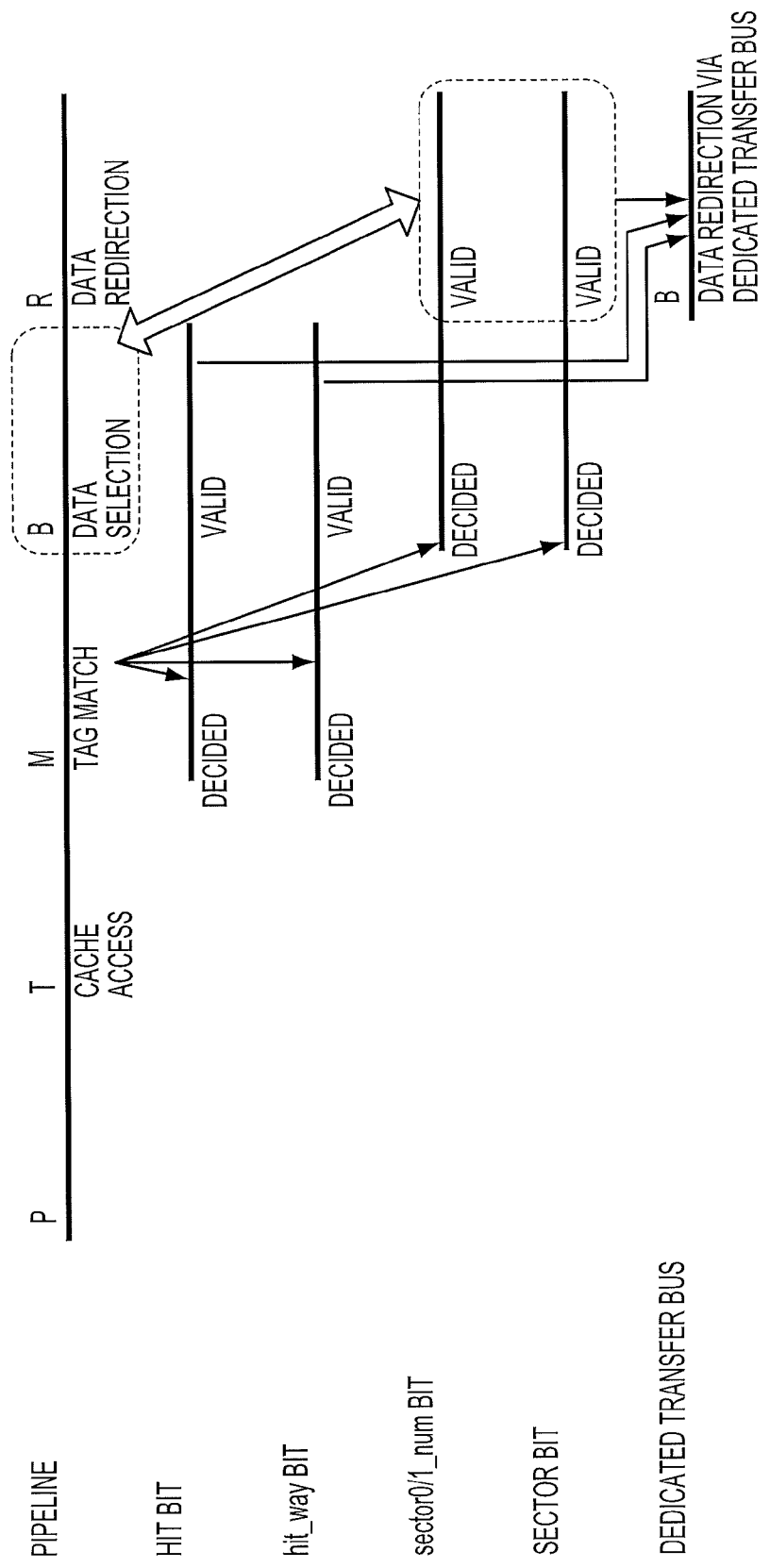
FIG. 12 illustrates a time chart for a dedicated bus used to read cache hit check results.

An example configuration of a server incorporating the CPU or the arithmetic processing unit disclosed in this embodiment is illustrated in FIG. 9. FIG. 9 is a view illustrating the configuration of the server. As illustrated in FIG. 9, the server includes a plurality of switching devices such as crossbars or an XB 101 and an XB 102 in a backplane 100. Each of the crossbars has system boards SB 110 to SB 113 and an I/O system board IOSB 150. Note that the number of the crossbars, the system boards, and the I/O system boards is only illustrative, and not limited thereto.

The backplane 100 is a circuit board for forming a bus that interconnects a plurality of connectors. The XBs 101 and 102 are switches for dynamically selecting the path of data exchanged between the system board and the I/O system board.

The SBs 110, 111, 112, and 113 connected to the XB 101 are an electronic circuit board that constitutes electronic devices and configured in the same manner. Thus, only the SB 110 will be described here. The SB 110 includes a system controller (SC) 110*a*, four CPUs, memory access controllers (MAC), and dual inline memory modules (DIMM).

The SC provides control to processing, for example, data transfer between CPUs 110*b* to 110*e* and MACs 110*f* and 110*g* incorporated into the SB 110, and to the entire SB 110. Each of the CPUs 110*b* to 110*e* is a processor which is connected to other LSIs via the SC to implement a method for controlling the cache memory as disclosed in the embodiments. The MAC 110*f* is connected between the DIMM 110*h* and the SC to control the access to the DIMM 110*h*. The MAC 110*g* is connected between the DIMM 110*i* and the SC to control the access to the DIMM 110*i*. The DIMM 110*h* is a memory module which is connected to another electronic device via the SC and in which memory can be installed for memory extension. The DIMM 110*i* is a memory module, serving as a main storage (main memory), which is connected to another electronic device via the SC and in which memory can be installed for memory extension.

An IOSB 150 is connected to each of the SBs 110 to 113 via the XB 101, and to I/O devices, for example, via a SCSI (Small Computer System Interface), FC (Fibre Channel), and Ethernet (Trade mark). The IOSB 150 controls processing, for example, data transfer between I/O devices and the XB 101. Note that the electronic devices, such as the CPU, MAC, and DIMM, incorporated into the SB 110 are only illustrative, so that the type or number of electronic devices are not to be limited to those illustrated.

One aspect of the device disclosed in the present application serves to reduce costs for a dedicated transfer bus and facilitate reading of cache hit check results.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing unit connected to a storage device for storing data, the arithmetic processing unit comprising:
    a first cache memory unit that holds a part of data stored in the storage device;
    an address register that holds an address;
    a flag register that stores flag information;
    a decoding unit that decodes a prefetch instruction for acquiring data stored at the address in the storage device; and
    an instruction execution unit that executes a cache hit check instruction instead of the prefetch instruction on the basis of a decoded result when the flag information is held, the cache hit check instruction allowing for searching the first cache memory unit with the address to thereby make a first cache hit determination that the first cache memory unit holds the data stored at the address in the storage device.

2. The arithmetic processing unit according to claim 1, further comprising a second cache memory unit that holds a part of data held in the first cache memory unit, and wherein,
    when executing the cache hit check instruction, the instruction execution unit searches the second cache memory unit with the address to make a second cache hit determination that the second cache memory unit holds the data stored at the address in the storage device.

3. The arithmetic processing unit according to claim 1, further comprising:
    a fetch storage unit that holds an instruction preceding the cache hit check instruction;
    a prefetch storage unit that holds data acquired by the prefetch instruction; and
    a lock information section that holds lock information indicating that store instructions preceding the cache hit check instruction are not all completed, and wherein
    the instruction execution unit executes the cache hit check instruction if the fetch storage unit and the prefetch storage unit do not hold valid data and the lock information section indicates that the store instructions preceding the cache hit check instruction are all completed.

4. The arithmetic processing unit according to claim 2, further comprising a first hit information register and a second hit information register, and wherein,
    when the instruction execution unit executes the cache hit check instruction, the first hit information register stores a first cache hit information that is the first cache hit determination result and the second hit information register stores a second cache hit information that is the second cache hit determination result.

5. The arithmetic processing unit according to claim 4, further comprising:
    a first hit way information register that indicates first way information of the first cache memory unit that holds the data stored at the address in the storage device when the first cache hit information is stored in the first hit information register; and a second hit way information register that indicates second way information of the second cache memory unit that holds the data stored at the address in the storage device when the second cache hit information is stored in the second hit information register.

6. The arithmetic processing unit according to claim 4, wherein the first cache memory unit includes a plurality of first sectors that is obtained by dividing a memory area of the first cache memory unit, the second cache memory unit includes a plurality of second sectors that is obtained by dividing a memory area of the second cache memory unit, and the arithmetic processing unit further comprises:

a first sector information register that indicates first sector information of the first cache memory unit that holds the data stored at the address in the storage device when the first cache hit information is stored in the first hit information register; and a second sector information register that indicates second sector information of the second cache memory unit that holds the data stored at the address in the storage device when the second cache hit information is stored in the second hit information register.

7. The arithmetic processing unit according to claim 6, further comprising:

a third sector information register that indicates the first sector information regardless of whether the first cache hit information is stored in the first hit information register; and a fourth sector information register that indicates the second sector information regardless of whether the first cache hit information is stored in the first hit information register.

8. The arithmetic processing unit according to claim 3, wherein the flag register stores therein the flag information by executing any of the preceding store instructions.

9. An information processing device comprising a storage device that stores data and an arithmetic processing unit that is connected to the storage device, the arithmetic processing unit comprising:

a first cache memory unit that holds a part of data stored in the storage device;

an address register that holds an address;

a flag register that stores flag information;

a decoding unit that decodes a prefetch instruction for acquiring data stored at the address in the storage device; and an instruction execution unit that executes a cache hit check instruction instead of the prefetch instruction on the basis of a decoded result when the flag information is held, the cache hit check instruction allowing for searching the first cache memory unit with the address to thereby make a first cache hit determination that the first cache memory unit holds the data stored at the address in the storage device.

10. The information processing device according to claim 9, wherein the arithmetic processing unit further comprises a second cache memory unit that holds a part of data held in the first cache memory unit, and when executing the cache hit check instruction, the instruction execution unit searches the second cache memory unit with the address to make a second cache hit determination that the second cache memory unit holds the data stored at the address in the storage device.

11. The information processing device according to claim 9, wherein the arithmetic processing unit further comprises:

a fetch storage unit that holds an instruction preceding the cache hit check instruction;

a prefetch storage unit that holds data acquired by the prefetch instruction; and a lock information section that holds lock information indicating that store instructions preceding the cache hit check instruction are not all completed, and the instruction execution unit executes the cache hit check instruction if the fetch storage unit and the prefetch storage unit do not hold valid data and the lock information section indicates that the store instructions preceding the cache hit check instruction are all completed.

12. The information processing device according to claim 10, wherein the arithmetic processing unit further comprises a first hit information register and a second hit information register, and when the instruction execution unit executes the cache hit check instruction, the first hit information register stores a first cache hit information that is the first cache hit determination result and the second hit information register stores a second cache hit information that is the second cache hit determination result.

13. The information processing device according to claim 12, the arithmetic processing unit further comprising:

a first hit way information register that indicates first way information of the first cache memory unit that holds the data stored at the address in the storage device when the first cache hit information is stored in the first hit information register; and a second hit way information register that indicates second way information of the second cache memory unit that holds the data stored at the address in the storage device when the second cache hit information is stored in the second hit information register.

14. The information processing device according to claim 12, wherein the first cache memory unit includes a plurality of first sectors that is obtained by dividing a memory area of the first cache memory unit, the second cache memory unit includes a plurality of second sectors that is obtained by dividing a memory area of the second cache memory unit, and the arithmetic processing unit further comprises:

a first sector information register that indicates first sector information of the first cache memory unit that holds the data stored at the address in the storage device when the first cache hit information is stored in the first hit information register; and a second sector information register that indicates second sector information of the second cache memory unit that holds the data stored at the address in the storage device when the second cache hit information is stored in the second hit information register.

15. The information processing device according to claim 14, the arithmetic processing unit further comprising:

a third sector information register that indicates the first sector information regardless of whether the first cache hit information is stored in the first hit information register; and a fourth sector information register that indicates the second sector information regardless of whether the first cache hit information is stored in the first hit information register.

16. The information processing device according claim 12, wherein the flag register stores therein the flag information by executing any of the preceding store instructions.

17. A control method for an arithmetic processing unit connected to a storage device for storing data, the method comprising:
  decoding, by a decoding unit included in the arithmetic processing unit, a prefetch instruction for acquiring data stored at an address in the storage device that is held in an address register; and
  executing, by an instruction execution unit included in the arithmetic processing unit, a cache hit check instruction instead of the prefetch instruction on the basis of a decoded result when flag information is held in a flag register, the cache hit check instruction allowing for searching a first cache memory unit that holds a part of data stored in the storage device with the address to thereby make a first cache hit determination that the first cache memory unit holds the data stored at the address in the storage device.

* * * * *

UNITED STATES PATENT AND TRADEMARK OFFICE
CERTIFICATE OF CORRECTION

PATENT NO.         : 8,707,014 B2
APPLICATION NO.    : 12/929021
DATED              : April 22, 2014
INVENTOR(S)        : Yamazaki et al.

It is certified that error appears in the above-identified patent and that said Letters Patent is hereby corrected as shown below:

In the Claims

Column 17, Line 5, Claim 16, delete "according claim" and insert -- according to claim --, therefor.

Signed and Sealed this
Twenty-second Day of July, 2014

Michelle K. Lee
*Deputy Director of the United States Patent and Trademark Office*